United States Patent Office 3,658,920
Patented Apr. 25, 1972

3,658,920
PROCESS FOR THE PRODUCTION OF PHENOLS
Herbert George Lawley, Robert Kerr, and Duncan Cuthbertson Curry, Norton-on-Tees, England, assignors to Imperial Chemical Industries Limited, London, England
No Drawing. Filed Aug. 1, 1968, Ser. No. 749,268
Claims priority, application Great Britain, Aug. 10, 1967, 36,697/67
Int. Cl. C07c 39/04
U.S. Cl. 260—624
7 Claims

ABSTRACT OF THE DISCLOSURE

Alkyl cycloalkyl and aralkyl groups are removed from substituted phenols using a ferric sulphate catalyst.

---

This invention relates to the production of phenols.

It has been proposed hitherto to remove alkyl groups from phenols with the aid of aluminium phenate catalysts. Such catalysts are however very sensitive to water and it is necessary completely to exclude water from the reaction medium and to handle and store the catalyst under anhydrous conditions.

It is an object of this invention to use a substantially water-insensitive catalyst.

According to the invention a process in which alkyl, cyclo-alkyl or aralkyl groups are removed from substituted phenols comprises contacting a phenol which is substituted by at least one alkyl, cyclo-alkyl or aralkyl group having at least 2 and preferably at most 12 carbon atoms, with ferric sulphate.

The ferric sulphate may be introduced to the reaction as the anhydrous material or as any hydrate; it may also be introduced as an aqueous solution. If desired the ferric sulphate may be produced in situ, for example by reacting ferric oxide or hydroxide with sulphuric acid. Preferably from 4% to 9% by weight of water is present.

It is preferred that the ferric sulphate should be substantially free from ferrous sulphate, which is inactive. Sulphuric acid may be present if desired.

Preferably from 75 to 200 and more preferably 85 to 115 equivalents of $SO_4^{--}$ ions are present per 100 equivalents of iron ions.

It is preferred that the substituted phenols to which this invention is applied should be substituted by tertiary alkyl or aralkyl groups preferably having 4 to 9 carbon atoms. Examples of phenols which may be used are p-isopropyl phenol, 3-methyl-4,6-di-tert.butylphenol, 4-methyl-2,6-di-tert.butylphenol, phenols with one or more butyl, nonyl or octyl groups especially those in which the carbon atom attached to the phenol ring is linked to three other carbon atoms, and para-cumyl phenol. Methyl groups are not removed in the present invention and when more than one removable group is present, at least one removable group may be left by not carrying the process to completion; thus tertiary groups are removed in preference to secondary and primary groups.

If 3-methyl-4,6-di-tert.butyl phenol is partially de-alkylated in accordance with this invention a substantial yield of 3-methyl-6-tert.butyl phenol is obtained substantially free from 3-methyl-4-tert.butyl phenol. As 3-methyl-6-tert.butyl phenol and 3-methyl-4-tert.butyl phenol are difficult to separate by distillation the process represents a particularly attractive method for preparing 3-methyl-6-tert.butyl phenol since the difficulty of separating the product is reduced compared with aluminium phenate catalysed processes in which both 3-methyl-6-tert.butyl phenol and 3-methyl-4-tert.butyl phenol are produced.

If 2,4,6-tri-tert.butyl phenol is de-alkylated in accordance with this invention, the initial product is 2,4-di-tert.butyl phenol. 2,4-di-tert.butyl phenol can be converted to 4-tert.butyl phenol, which in turn can be converted to phenol. Thus 2,4,6-tri-tert.butyl phenol may be converted to 4-tert.butyl phenol or to phenol itself if desired.

It is a further attractive feature of the invention that it may be applied to the high boiling residue obtained by distilling acetone and phenol from the reaction product produced by splitting cumene hydroperoxide to phenol and acetone in the well-known process for the production of phenol from cumene. This residue contains para-cumyl phenol usually in a proportion of from 10 to 35% by weight, phenyl dimethyl carbinol usually in a proportion of from 5 to 30% by weight, acetophenone and small quantities of phenol and alpha methyl styrene, the balance being oligomers of alpha methyl styrene such as phenyl substituted hexenes and substituted indanes. We have found that the process of the invention not only splits para-cumyl phenol into alpha methyl styrene and phenol but also tends to bretk down phenyl dimethyl carbinol and the oligomers of alpha methyl styrene to give enhanced yields of alpha methyl styrene. Thus additional phenol and substantial quantities of alpha methyl styrene may be produced from these residual waste products. The alpha methyl styrene obtained in this way may be hydrogenated to give more cumene for the original phenol-from-cumene process.

The reaction according to the present invention is advantageously carried out at a temperature of at least 100° C.; temperatures of up to the boiling point of tht materials present may be employed though the temperatures used will not normally exceed 350° C. Temperatures in the range 200° C. to 350° C. and preferably 250° to 300° C. are normally employed when aralkyl phenols are to be treated and temperatures in the range 100° to 250° C. and preferably in the range 120° to 220° C. and more preferably 120° to 200° C. are normally employed when lower tertiary alkyl groups such as tertiary butyl groups are to be removed.

A wide range of pressures may be employed in the present process but pressures in the range 0.1 to 50 atmospheres and preferably in the range of 1 to 5 atmospheres are particularly to be preferred.

The concentration of ferric sulphate may be in the range 0.01 to 5% by weight and is preferably 0.1 to 0.5% by weight and more preferably 0.25 to 0.47 by weight expressed as the anhydrous material, based on the weight of the substituted phenol present.

It is desirable to exclude oxygen from the reaction medium and this may be achieved by operating in an atmosphere of an inert gas such as nitrogen or a gaseous hydrocarbon; for example the gas may be the olefinic or substituted olefinic compound corresponding to the alkyl, cycloalkyl or aralkyl groups to be removed.

The ferric sulphate does not normally dissolve to any appreciable extent in the reaction medium and it is therefore desirable to agitate the reaction medium, for example with a mechanical stirrer or an inert gas, for example nitrogen.

The ferric sulphate may be at least partly reduced in the course of the reaction. If this occurs fresh ferric sulphate may be introduced.

The process may be carried out in a batchwise, semi-continuous or continuous manner.

If desired an inert solvent such as benzene, cumene or a $C_6$ to $C_{20}$ paraffin may be present but such solvents may in some cases complicate the process.

The products of this invention may be purified by conventional methods, for example distillation. When the substituted phenol has been only partially dealkylated it may be desirable to de-activate the catalyst before the product is distilled at an elevated temperature by adding a suitable amount of an alkali, for example sodium or potassium hydroxide, to decompose the ferric sulphate. When the distillation is carried out under vacuum at a temperature below that at which further reaction occurs these precautions are unnecessary.

EXAMPLE 1

A mixture of 3-methyl-4,6-di-tert.butyl phenol (melting point 56.5° C., 1500 grams, i.e. 6.818 moles) and hydrated ferric sulphate (7.5 grams, water content 6.2%) was charged to a flask equipped with a thermometer, mechanical stirrer and vertical condenser, the top of which was vented via a gas meter and gas sampling device. The stirred mixture was gradually heated, and samples were withdrawn at intervals and analysed by gas/liquid chromatography, with the results shown below.

TABLE 1

| Reaction time (hr.) | Reactor temp. (° C.) | Off-gas rate (l./hr.) | Analysis of reaction mixture (percent w./w.) | | | |
|---|---|---|---|---|---|---|
| | | | 3-methyl-4,6-di-tert. butyl phenol | 3-methyl-6-tert. butyl phenol | 3-methyl-4-tert. butyl phenol | 3-methyl phenol |
| 0.5 | 100 | 1.0 | ca. 96 | 4 | <0.5 | <0.5 |
| 2.0 | 121 | 30 | 68 | 31 | | <0.5 |
| 4.0 | 149 | 40 | 35 | 61 | <0.5 | 3.5 |
| 6.0 | 180 | 65 | 2.0 | 48 | | 50 |
| 8.0 | 195 | 50 | 1.0 | 4.0 | | ca. 93 |
| 10.0 | 196 | 20 | <0.5 | 2.0 | <0.5 | ca. 95 |
| 12.0 | 200 | <1 | <0.5 | <0.5 | <0.5 | ca. 95 |

The experiment was terminated after 12 hours, by which time gas evolution had virtually ceased. The material in the flask (768.0 grams after correction for the small quantities of intermediate samples removed for analysis) contained most of the catalyst as a solid phase. Based on the 12-hour analysis (say 95% 3-methyl phenol) and assuming a final solid-free product of 760.5 grams, the conversion of 3-methyl-4,6-di-tert.butyl phenol to m-cresol after 12 hours (allowing for sample withdrawal) was 98.2% of theory i.e. 722.5 grams m-cresol was produced. The off-gas from the experiment (739.5 grams) was iso-butene of >99% purity corresponding to a yield of 96.8% of theory.

EXAMPLE 2

The production of 3-methyl-6-tert.butyl phenol from 3-methyl-4,6-di-tert.butyl phenol is shown by the experiments summarised in Table 2. All these debutylations were carried out using the same apparatus and procedure as in Example 1, except that the reaction was terminated by cooling at an appropriate intermediate stage as determined by frequent analysis of the reaction mixture. The partially debutylated material was then treated with aqueous alkali (usually ca. 6.5–7.0 moles NaOH per mole ferric sulphate charged), and fractionally distilled at a pressure of 76 mm. of mercury and a reflux ratio of 5:1. The 3-metyhl phenol and 3-methyl-6-tert.butyl phenol fractions from all the experiments were of good quality (see crystallising points and melting points given in Table 2).

TABLE 2

| | Experiment No. | | |
|---|---|---|---|
| | 1 | 2 | 3 |
| 3M46B charged (g.) | 1,500 Hydrate* | 1,500 Hydrate* | 1,500 Solution.  |
| Ferric sulphate charged wt. percent Fe$_2$(SO$_4$)$_3$ on 3M46B | 0.75 g | 7.50 g | 15.0 ml. |
| Reaction: | | | |
| Temp | 120→200° | 120→150° | 120→147°. |
| Time | Over 8.5 hr | Over 62 hr | Over 16.5 hr. |
| Weight of product (g., corrected for samples and for residual solid) | 1,037.2 | 1,149.5 | 1,063.7. |
| Analysis of prouct (weight percent): | | | |
| 3M46B | 7 | 7 | 5.5. |
| 3M6B | 60 | 70 | 75. |
| 3M4B | <1 | <1 | <1. |
| 3M | 25 | 12 | 17. |
| Efficiencies (percent): | | | |
| 3M48B conversion | 95.2 | 94.6 | 96.1. |
| 3M yield on 3M46B converted | 37.0 | 19.8 | 25.5. |
| 3M6B yield on 3N46B converted | 58.4 | 76.0 | 74.2. |
| 3M+3M6B yield on 3M46B converted | 95.4 | 95.8 | 99.7. |
| NaOH added prior to distillation of crude | 0.5 g. in 2 ml. water | 5.0 g. in 10 ml. water | 5.0 g. in 10 ml. water. |
| Distillation fractions (wt. percent of still charge): | | | |
| Light ends | 5.8 | 3.9 | 5.0. |
| 3M main cut | 12.9 (X pt. 11.2°) | 10.4 (X pt. 11.0°) | 12.6 (X pt. 11.1°). |
| Light inters | 4.4 | 1.0 | 6.6. |
| 3M6B main cut | 53.0 (M.P. 21.4°) | 64.7 (M.P. 22.4°) | 61.0 (M.P. 22.4°). |
| Heavy inters | 16.2 | 9.6 | 4.6. |
| Distallation residue | 6.3 | 8.9 | 8.3. |
| Distillation loss | 1.4 | 1.5 | 1.9. |
| Overall efficiencies (mole percent on 3M46B converted): | | | |
| Yield of main 3M fraction | 19.1 | 17.1 | 18.9. |
| Yield of main 3M6B fraction | 51.6 | 70.2 | 60.3. |
| Yield of main 3M+3M6B fraction | 70.7 | 87.3 | 79.2. |

*The aqueous solution contained 47.8 g. FE$_2$(SO$_4$)$_3$ per 100 ml. The hydrate contained 6.2% w./w. water.

NOTE.—3M=3-methyl phenol. 3M4B=3-methyl-4-tert.butyl phenol. 3M6B=3-methyl-6-tert.butyl phenol. 3M46B=3-methyl-4,6-di-tert.butyl phenol.

EXAMPLE 3

A mixture of hydrated ferric sulphate (1.5 g.) and high-boiling by-products of the decomposition of cumene hydroperoxide to phenol and acetone (300 g., composition shown in Table 3 column 1) was charged to a flask fitted with a thermometer, mechanical stirrer and side-arm vapour take off line, which passed via a water condenser to a vented product receiver. The mixture was quickly heated to 215° C. and then slowly from 215° to 290° C. over two hours, during which time the bulk of the reaction occurred. 230.1 g. (76.7 wt. percent yield, on material charged) of product distilled over. This was analyzed by gas/liquid chromatography with the results shown in Table 3. The residual material in the reaction flask weighed 66.4 g.

TABLE 3

| | By-product feed composition | Distillate composition |
|---|---|---|
| Cumene | <0.5 | 7.5 |
| Alpha-methylstyrene | <0.5 | 38.0 |
| Acetophenone | 16.0 | 20.0 |
| Phenyldimethyl carbinol | 17.0 | 3.5 |
| Phenol | 2.5 | 16.0 |
| Trimethylphenylindane* | 1.5 | <0.5 |
| Diphenylmethylpentene-1* | 13.5 | 1.5 |
| Diphenylmethylpentene-2* | 3.0 | 1.0 |
| Para-cumylphenol | 26.0 | 1.5 |
| Other (by difference) | 20.5 | 11.0 |
| Total | 100.0 | 100.0 |

*Dimers of alpha-methylstyrene.

EXAMPLE 4

To 450 g. of a crude 2,4,6-tri-tert.butyl phenol containing 68% by weight 2,4,6-tri-tert.butyl phenyl, 25% by weight 2,6-di-tert.butyl phenol, 5% by weight 2,4-di-tert. butyl phenol and 2% by weight ortho-tert.butyl phenol was added 11.2 gm. of a 45% aqueous solution of ferric sulphate.

The mixture was heated with stirring to 130° C. to evaporate the water and then raised under atmospheric pressure from 170° to 200° C. over a period of 8 hours after which it was maintained at 200° C. for a further 16 hours. After that time the mixture had an analysis, 85% by weight para-tert.butyl phenol, 8% 2,4-di-tert.butyl phenol, 6% phenol, the remainder being 2,6-di-tert.butyl phenol and 2,4,6-tri-tert.butyl phenol.

EXAMPLE 5

Para-(1,1,3,3-tetramethylbutyl) phenol (500 g.) and a 40% aqueous solution of ferric sulphate (12.5 g.) were heated to reflux under a Dean and Stark head. Water first passed over and then di-isobutene. The residue was then analysed.

A first sample, after heating for 21⅔ hours at 170° C. and then for 6.5 hours at 200° C. gave a residue of analysis, para - 1,1,3,3 - tetramethylbutyl phenol 67%, phenol 32% and di-isobutene 1% by weight, and a second sample heated at 200° C. for 2¼ hours gave a residue of analysis para-1,1,3,3-tetramethylbutyl phenol 74% and phenol 26% by weight.

What is claimed is:

1. A process which comprises removing alkyl or aralkyl groups from alkyl or aralkyl substituted phenols by contacting phenol which is substituted in the ortho or para positions by at least one alkyl or aralkyl group having 2 to 12 carbon atoms at a temperature of 100–350° C. and a pressure of 0.1–50 atmospheres with ferric sulphate.

2. A process as claimed in claim 1 in which the temperature is in the range 120° to 200° C.

3. A process as claimed in claim 1 in which the concentration of ferric sulphate is from 0.01 to 5% by weight expressed as the anhydrous material.

4. A process as claimed in claim 3 in which the ferric sulphate is introduced as an aqueous solution.

5. A process as claimed in claim 1 in which the group is a tertiary alkyl group having 4 to 9 carbon atoms.

6. A process as claimed in claim 5 in which 3-methyl-4,6-di-tert.butyl phenol is dealkylated to 3-methyl-6-tert.butyl phenol.

7. A process as claimed in claim 5 in which 2,4,6-di-tert.butyl phenol is dealkylated to 4-tert.butyl phenol.

References Cited
UNITED STATES PATENTS

| | | | |
|---|---|---|---|
| 2,295,672 | 9/1942 | Meharg | 260—621 |
| 2,733,274 | 1/1956 | Cowie | 260—624 |

BERNARD HELFIN, Primary Examiner

W. B. LONE, Assistant Examiner

U.S. Cl. X.R.

260—621